United States Patent
Earl et al.

(10) Patent No.: US 10,069,788 B1
(45) Date of Patent: Sep. 4, 2018

(54) CONTROLLING A HIGH AVAILABILITY COMPUTING SYSTEM

(71) Applicant: Sprint Communications Company L.P., Overland Park, KS (US)

(72) Inventors: Bryson Earl, Altamonte Springs, FL (US); Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 358 days.

(21) Appl. No.: 15/084,188

(22) Filed: Mar. 29, 2016

(51) Int. Cl.
*H04L 29/12* (2006.01)
*H04L 12/26* (2006.01)
*H04L 12/24* (2006.01)

(52) U.S. Cl.
CPC .......... *H04L 61/1511* (2013.01); *H04L 41/12* (2013.01); *H04L 43/0805* (2013.01); *H04L 41/0609* (2013.01); *H04L 41/0622* (2013.01); *H04L 43/04* (2013.01)

(58) Field of Classification Search
CPC . H04L 41/12; H04L 41/0622; H04L 41/0609; H04L 43/04
See application file for complete search history.

(56) References Cited

U.S. PATENT DOCUMENTS

2004/0162909 A1 * 8/2004 Choe ................ H04L 29/12066
709/230

* cited by examiner

*Primary Examiner* — Yves Dalencourt

(57) ABSTRACT

A method for providing high availability computing service. The method comprises monitoring a high availability computing service by monitoring applications, each monitoring application executing on a different computer system, one of the monitoring applications executing in a primary role, and the remaining monitoring applications executing in a secondary role. The method further comprises writing a last touched time value into a DNS resource record of a domain name system (DNS) server by the monitoring application executing in the primary role, reading the last touched time value in the DNS resource record of the DNS server by each of the monitoring applications executing in the secondary role. The method comprises determining by one of the monitoring applications executing in the secondary role to assume the primary role based on determining that the last touched time value in the DNS resource record of the DNS server exceeds a predetermined age threshold.

19 Claims, 6 Drawing Sheets

CONTROLLING A HIGH AVAILABILITY COMPUTING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The domain name system (DNS) is a distributed system and/or protocol for promoting data communication based on logical names. For example, the DNS provides translation from a domain name logical name (e.g., paft.uspto.gov) to a specific Internet protocol (IP) address of a specific host computer. The DNS supports alternative mappings of logical name to specific host addresses that may be employed, for example, to route client requests directed to a logical name originating from clients on the West Coast to hosts located on the West Coast and to route other client requests directed to the same logical name but originating from clients on the East Coast to hosts located on the East Coast, thereby conserving communication network resources and reducing data communication latency.

Highly available computer systems and/or highly available computing services may support mission critical services, for example an e-commerce web site for a major on-line retailer. The design of such highly available computer systems may rely on a variety of strategies to reduce the probabilities of downtime and to minimize the duration of downtime. Some of the strategies may be based on providing redundant processing capability so that if one server computer crashes, the load of continuing client requests can be handled by other servers through redirecting client requests, for example by changing a mapping of a logical name to the failed server to map the same logical name to an active server.

A network operations center (NOC) may be provided by a telecommunication service provider to monitor and manage its communications infrastructure. The NOC may comprise a complicated software tool or application that receives and processes large volumes of data to provide various different views into the status of the telecommunication service provider's network infrastructure. The NOC application may provide alarms and access to trouble tickets to operators. The NOC application may provide drill-down views to quickly visualize the current behavior and functioning of the telecommunication service provider's network infrastructure and to provide controls to reset equipment and to adjust equipment settings. In some cases, the NOC application may be provided as a highly available computing service.

SUMMARY

In an embodiment, a method of providing a high availability computing service is disclosed. The method comprises monitoring a first computer system and a second computer system by a monitoring application executing on a third computer system, wherein the monitoring application executing on the third computer system is acting in a primary role, where the first computer system and the second computer system execute the same service application in a redundant configuration and wherein each redundant configuration is referenced by a common domain name and monitoring the first computer system and the second computer system by a monitoring application executing on a fourth computer system, wherein the monitoring application executing on the fourth computer system is acting in a secondary role. The method further comprises writing to a DNS resource record by the monitoring application having the primary role to a domain name system (DNS) server, where the DNS resource record indicates a last touched time, determining by the monitoring application having the primary role that the service application on the first computer system is not available, and, in response to determining the service application on the first computer system is not available, writing one of a DNS A record or a DNS AAAA record that associates an IP address of the second computer system to the common domain name by the monitoring application having the primary role to a plurality of DNS servers, whereby the monitoring application having the primary role fails-over the service application to the second computer system. The method further comprises monitoring the DNS resource record in the DNS server by the monitoring application executing in the secondary role, detecting by the monitoring application executing in the secondary role that the last touched time in the DNS resource record in the DNS server is more than a predefined period of time old, and, in response to detecting that the DNS resource record last touched time is more than the predefined period of time old, writing to the DNS resource record by the monitoring application executing on the fourth computer system to indicate that the monitoring application executing on the fourth computer system has assumed the primary role.

In another embodiment, a method of providing a high availability computing service is disclosed. The method comprises monitoring a high availability computing service by a plurality of monitoring applications, each of the plurality of monitoring applications executing on a different computer system, one of the plurality of the monitoring applications executing in a primary role, and the remaining monitoring applications executing in a secondary role. The method further comprises writing a last touched time value into a DNS resource record of a domain name system (DNS) server by the monitoring application executing in the primary role, reading the last touched time value in the DNS resource record of the DNS server by each of the monitoring applications executing in the secondary role. The method further comprises determining by one of the monitoring applications executing in the secondary role that the last touched time value in the DNS resource record of the DNS server exceeds a predetermined age threshold, and, in response to determining the last touched time value exceeds the predetermined age threshold, writing an identity of the one of the monitoring applications that determined the last touched time value exceeds the predetermined age threshold into a primary monitoring application identity field in the DNS resource record of the DNS server, whereby the monitoring application executing in the secondary role transitions to executing in the primary role on the event of failure of the monitoring application that had been executing in the primary role.

In still another embodiment, a high availability computing service system is disclosed. The system comprises a plurality of application servers and a plurality of service monitoring servers. Each application server comprises an application server processor, an application server non-transitory memory, and a service application stored in the application server non-transitory memory. When executed by the application server processor, the service application receives and processes client requests addressed to a common domain name that is mapped by a domain name system (DNS) to an application server from among the plurality of application servers. Each service monitoring server comprises a monitoring server processor, a monitoring server non-transitory memory, and a monitoring application stored in the non-transitory memory. The monitoring application is configured to operate in a primary monitoring mode and to operate in a secondary monitoring mode. When operating in the primary mode, the monitoring application monitors the plurality of application servers, writes a current time value periodically to a last touched time value into a DNS resource record of a DNS server, and when one of the plurality of application servers fails, writes one of a DNS A record or a DNS AAAA record to a DNS server that associates an IP address of an active one of the plurality of application servers to a common domain name whereby the client requests to the failed application server are directed to an active application server. When operating in the secondary mode, the monitoring application monitors the plurality of application servers, reads the last touched time from the DNS resource record of the DNS server, detects when the DNS resource record last touched time is more than a predefined period of time old, when the DNS resource record last touched time is detected to be more than the predefined period of time old write to the DNS resource record of the DNS server to indicate that the monitoring application executing in secondary mode has assumed the primary mode role, whereby the monitoring application executing in the secondary monitoring mode assumes the primary mode role when the monitoring application executing in the primary mode role fails.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
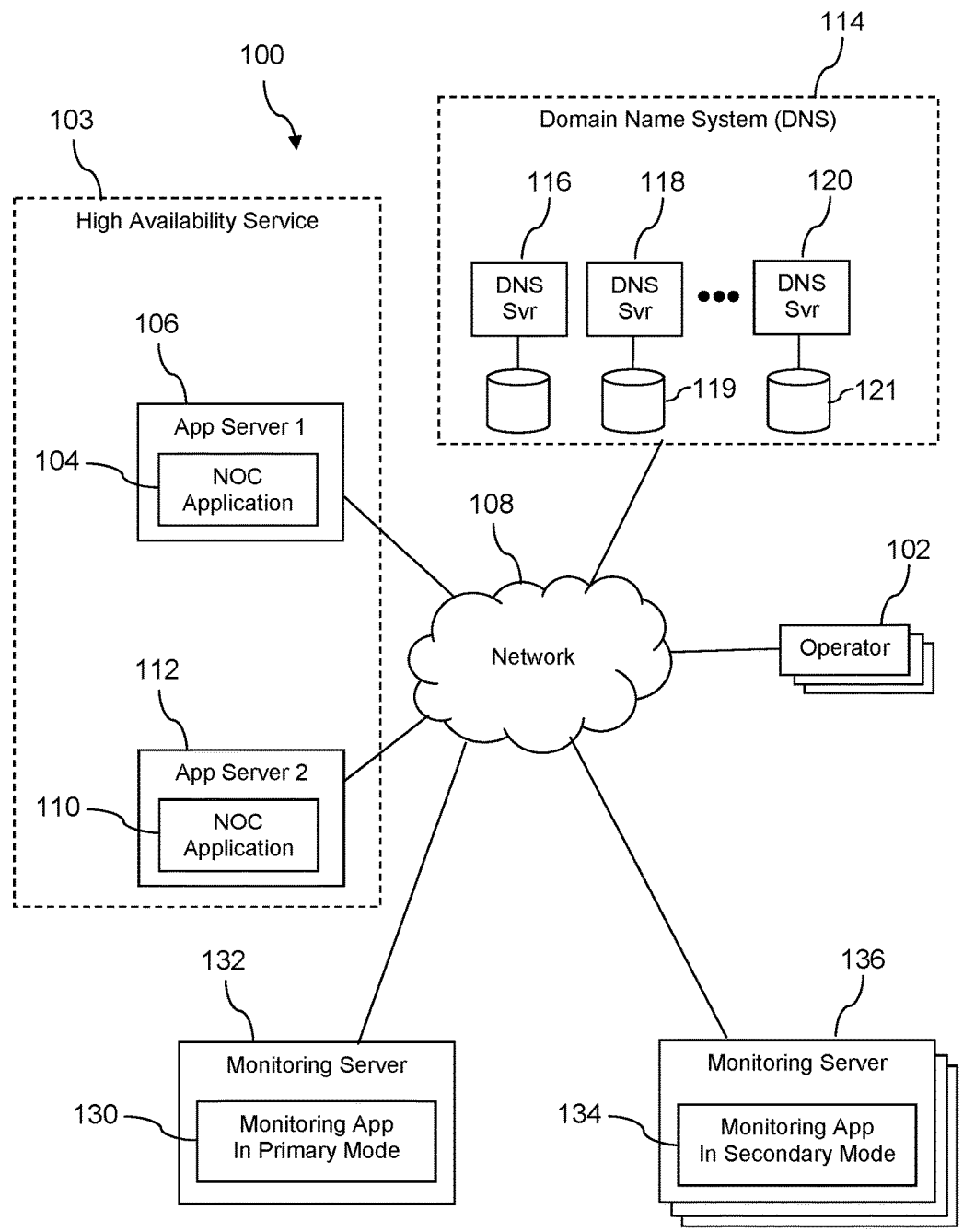
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for providing and controlling a high availability computing service is taught herein. In an embodiment, the high availability computing service is a network operations center (NOC) tool that promotes operators monitoring and managing a complicated telecommunication service provider's network infrastructure, but it is understood that the problem of providing high availability computing services is applicable to many other use cases. For example, the high availability computing service may be an e-commerce on-line retail sales service, an electrical power distribution grid monitoring and management service, or another service. A high availability computing service may be provided by a plurality of computer systems executing a common service application. Clients desiring to access the subject service may send their service requests to a logical name of the service, for example to a domain name designating the service. In general a high availability computing service is a computer service that is expected and/or promised to provide its computer services for a greater than normal period of time. In some environments, the high availability of the computing service may be quantified in a service level agreement (SLA) or a contractual agreement.

A particular domain name system (DNS) server may resolve the logical name to an IP address of a particular host executing the service application. The DNS, as a whole, may be configured to resolve the same logical name to different IP addresses and hence routing the client service requests to different redundant hosts executing the service application depending on a communication path of the incoming client request. For example, the DNS may be configured to resolve the logical name "NOC-tool.corp.bigtelecomco.com" received from an operator workstation located in California to an IP address of a host computer located in Oregon and to resolve the same logical name received from an operator workstation located in Virginia to an IP address of a host computer located in Tennessee. The domain name resolution in these two cases may be performed by different DNS servers, for example by a first DNS server located close to the operator workstation located in California in the first case and by a second DNS server located close to the operator workstation located in Virginia in the second case.

The high availability computing service may provide high availability, in part, by providing excess processing capacity and redistributing client requests to active hosts when one of the hosts fails. The redistributing of client requests may be referred to as "failing over" the failed host or the failed application. In the example described above, failing over may be accomplished by changing the DNS, as a whole, to resolve the mappings that formerly would resolve the domain name to the IP address of the failed host to instead map the same domain name to the IP address of one of the active hosts. This may be accomplished by writing an A record or an AAAA record to the appropriate DNS server(s) changing the logical name to IP address mapping maintained by that specific DNS server. Following the example above, if the host computer located in Oregon fails, the first DNS server may be reconfigured to resolve "NOC-tool.corp.bigtelco.com" to the IP address of the host located in Tennessee. In this case, the operator workstation in California that makes a request to "NOC-tool.corp.bigtelco.com" has its request routed to the host in Tennessee where it is executed by the application executing on that host.

Communication messages addressed to a computer system using a logical name may be said to be routed using a two-step process: (1) first the logical name is mapped or translated to an IP address and (2) the communication message is routed to the computer system using the IP address. When the description herein refers to routing based on a logical name or a domain name, it will be understood that this two-step process is being followed.

A monitoring service may be provided to detect when a high availability computing service is failed and to perform actions to failover the subject computing service, for example by writing an A record or an AAAA record (or both, to handle a dual-stack environment) to the appropriate DNS server. What happens, however, if the monitoring service fails? The present disclosure teaches a monitoring service comprising common monitoring applications executing on different computer systems. One of the monitoring applications assumes a primary mode of operation, monitors the highly available applications or computer systems, and takes responsibility for failing over highly available applications or computer systems as described above. At the same time, the monitoring application executing in primary mode periodically writes or updates a last touched time value into a DNS TXT record in one of the DNS servers. As is known to one skilled in the art, a DNS TXT record is a resource record that supports any kind of text information to be associated with a host or other name and does not impose a protocol defined format on the structure of the text information.

The other monitoring applications execute in a secondary mode of operation that also monitors the highly available applications or computer systems but do not initiate failover. The monitoring applications executing in the secondary mode of operation review the last touched time value from the TXT record in the appropriate DNS server. If one of the monitoring applications executing in the secondary mode of operation determines that the age of the last touched time value exceeds a predetermined age threshold (e.g., two minutes), the application writes or updates its own identity to a primary monitor identity field in the TXT record of the DNS server. After completing this write, the subject monitoring application then assumes the role of the primary mode of operation. The monitoring application that executes in the primary mode of operation may read from the TXT record of the DNS server to first assure that it retains the role of primary mode of operation by confirming that its identity remains in the primary monitor identity field. When the monitoring application that had been executing in primary mode of operation is relieved of duty—because of not updating the last touched time value timely—it will detect this by reading the primary monitor identity field and discovering that a different identity is present, will transition to a secondary mode of operation state, and begin executing in the secondary mode of operation.

While this disclosure speaks of using DNS TXT records for tracking the status and the identity of the monitoring application that has the responsibility of primary mode of operation, it is understood that, in an embodiment, a different DNS resource record type may be used for this purpose. For example, in an embodiment, a DNS HINFO record may be applied for the purpose of tracking last touched time and an identity of a monitoring application and/or its host computer currently executing in the primary mode of operation. While some DNS software checks the format of data in certain record types (e.g., verifies that an A record comprises a valid IPv4 address), with creativity the desired data can be packed into a variety of other DNS resource record types that are not constrained by DNS software checks to a rigid format and hence yet other DNS resource record types may be used to track the status and identity of the monitoring application that has the responsibility of primary mode of operation.

In this way, if the monitoring application that has responsibility for monitoring and failing over the high availability application and/or computer system itself fails, the role of monitoring and failing over failed applications and computer systems is timely transferred to an active alternative monitoring application. In the example given above of a two minutes aging threshold, the maximum downtime of the monitoring functionality may be limited to about two minutes in a worst case. In some contexts the monitoring application executing in the primary mode of operation may be said to be executing in a primary role, and the monitoring application executing in the secondary mode of operation may be said to be executing in a secondary role.

In an embodiment, if the monitoring application executing in the primary role determines that a plurality of independent high availability applications or computer systems has failed, the monitoring application does not initiate a failover and stops updating the last touched time value in the TXT record of the DNS server, thereby promoting a different monitoring application assuming the role of primary monitoring mode. This circumstance may arise if the communication network to which the monitoring application executing in the primary operation mode has failed, for example if a firewall has been temporarily misconfigured or due to an accidental cut in a fiber communication line. It is thought that the reliance on the updating of a TXT in the DNS server may avoid some errors that may arise in communication systems. For example, sometimes specific protocols are blocked by firewalls or other communication functions such as gateways or session border controllers. By piggy-backing this signaling mechanism on the DNS protocol itself some of these possible errors may be avoided.

The challenge of monitoring and failing over high availability computer delivered services is inextricably tied to computer technology. The present disclosure teaches several improvements and innovative solutions to meet this challenge. Not only does the teaching provided provide monitoring and failover, it provides for the timely transfer of failover authority in the event of failure in the monitoring and failover mechanism. Further, by deploying this solution on top of the DNS a further degree of reliability is achieved (that is, the DNS messages employed by this mechanism to maintain and transfer failover authority are not likely to be stopped by firewalls or other filters). The system provides a flexible, central handoff mechanism that entails low overhead by avoiding explicit handshaking or notices. Thus, the system and method disclosed herein can be seen as an improved computer system or as an improvement to a computer system.

It is understood that the system described above may be applied in a variety of ways. An additional example application is that it may provide a framework to easily direct traffic to a specific host, even bypassing localized load balancing. Generally, localized load balancing may be performed using a virtual IP address so the DNS does not come into play. Using the system described above, however, the A record (or AAAA record, as the case may be) can be modified to replace an IP address of a localized load balancer to an IP address of a physical host. This may allow traffic to go to a single server in a single location if there is a suspicion that the other infrastructure (e.g., localized load balancing) is not working correctly.

Turning now to FIG. 1, a system 100 is described. In an embodiment, system 100 comprises one or more operator workstations 102 that access and/or use a high availability service 103. For example, one of the operator workstations 102 may use a service provided by a network operations center (NOC) application 104 executing on a first application server 106. In other embodiments, however, the high availability service 103 may provide services different from a NOC application. For example, the high availability service 103 may provide an e-commerce on-line retail sales application that executes on a plurality of application servers. For example, the high availability service 103 may provide an electrical power distribution grid monitoring and management application that executes on a plurality of application servers. The operator workstations 102 communicate with the high availability service 103 via a network 108. The network 108 may comprise one or more private networks, one or more public networks, or a combination thereof.

The high availability service 103 may promote high availability of the subject service (in the current example and as illustrated in FIG. 1, a NOC service) through a variety of techniques including redundancy of execution platforms. For example, the high availability service 103 may comprise a plurality of application servers such that failure of one or more application servers does not typically prevent timely handling of requests from operator workstations 102. As illustrated in FIG. 1, the high availability service 103 may further comprise a NOC application 110 executing on a second application server 112. The NOC applications 104, 110 may be the same application (same computer program, same executable image) providing substantially identical processing. In another embodiment, the high availability service 103 may comprise any number of application servers and may support two or more different applications. In an embodiment, the first application server 106 and the second application server 112 may each be implemented as a computer system. Computer systems are discussed further hereinafter. Each of the first application server 106 and the second application server 112 may be implemented as a plurality of hosts. In an embodiment, the first application server 106 and the second application server 112 are located geographically separate from each other such that a regional disturbance that impairs one application server—flood, devastating storm, earthquake, power grid failure—does not impair the other application server. This separate geographical location of the servers 106, 112 may be said to provide geographical redundancy in some contexts herein.

The operator workstation 102 may execute a client of the NOC application 104, 110—which may be referred to as a NOC client—that allows a NOC employee to use functions of the NOC application such as monitoring current alarms, viewing trouble tickets, drilling down into network infrastructure, controlling the network infrastructure by adjusting component parameters and/or resetting equipment, and coordinating with other NOC employees. When the NOC client or operator workstation 102 sends a request to the high availability service 103 it may direct the request to a logical name, for example to a domain name such as "NOC-tool.corp.bigtelecomco.com." The logical name may be mapped to a specific IP address of an application server 106, 112 by a domain name system (DNS) 114 that performs a name resolution service. Communication messages addressed to a computer system using a logical name may be said to be routed using a two-step process: (1) first the logical name is mapped or translated to an IP address and (2) the communication message is routed to the computer system using the IP address. When the description herein refers to routing based on a logical name or a domain name, it will be understood that this two-step process is being referenced.

The DNS 114 may comprise a plurality of domain name servers, for example a first domain name server 116, a second domain name server 118, and a third domain name server 120. The domain name servers 116, 118, 120 may perform different roles or functions of the DNS 114. Depending on various factors, the name resolution may be performed by different DNS servers, and some of the different DNS servers may resolve the same logical name to different IP addresses and hence cause messages directed to the same logical name to be routed to different application servers. For example, a first operator workstation 102 located in Tracy, Calif. may have a NOC client request directed to the first application server 106 located in Oregon, because the second DNS server 118 (possibly physically closest to Tracy) is configured to resolve the logical name of the high availability service 103 (e.g., NOC-tool.corp.bigtelcomco.com) to the IP address of the first application server 106. A second operator workstation 102 located in Reston, Va. may have a NOC client request directed to the second application server 112 located in Chattanooga, Tenn., because the third DNS server 120 (possibly physically closest to Reston) is configured to resolve the logical name of the high availability service 103 to the IP address of the second application server 112. Different name resolution values may be configured into the DNS 114 to promote efficient use of network resources and/or a kind of load balancing.

In the event that an application server 106, 112 goes down, the name resolution in the DNS 114 may be changed to cause NOC client requests that would otherwise route to the failed application server to instead route to the active application server (or active application servers). For example, if the first application server 106 goes down (because of a system crash, because of scheduled maintenance, because of loss of electrical power, because a backhoe has cut the fiber connection of the application server 106 to the network 108, or for any of a variety of other reasons), the name resolution A record and/or AAAA record in the second DNS server 118 may be changed to map the logical name "NOC-tool.corp.bigtelecomco.com" to the IP address of the second application server 112. It is understood that a DNS A record is associated with IPv4 addresses while a DNS AAAA record is associated with IPv6 addresses. Throughout this disclosure it is understood that anywhere an A record is referred to an AAAA record can also be used, when appropriate and where an AAAA record is referred to, an A record can also be used, when appropriate.

In an embodiment, a plurality of monitoring servers 132, 136 monitor the functioning of the high availability service 103 and control failover of redundant application servers 106, 112 when needed. "Failing over" means transferring the client request load that would otherwise be directed to a failed server to an active server. In the present disclosure, failover is accomplished by changing the A record (or AAAA record) name resolution to resolve a logical name to an active server. Each of the monitoring servers 132, 136 execute a monitoring application that may execute in either a primary mode of operation or a secondary mode of operation. As illustrated in FIG. 1, a first monitoring application 130 is executing in a primary mode of operation on the first monitoring server 132, and a second monitoring application 134 is executing in a secondary mode of operation on a second monitoring server 136. It is understood that there may be any number of monitoring servers 132, 136, each executing a monitoring application. At any given time, only one monitoring application executes in the primary mode of operation and the remaining monitoring applications execute in the secondary mode of operation.

Figure 2:
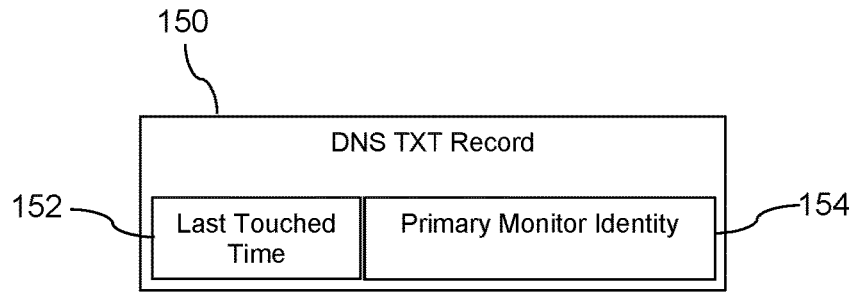
FIG. 2 is an illustration of a domain name system (DNS) TXT record according of an embodiment of the disclosure.

Turning now to FIG. 2, a DNS TXT record 150 is described. The DNS TXT record 150 may comprise a last touched time 152 and a primary monitor identity 154. The monitoring application that is executing in the primary mode of operation (monitoring application 130 as illustrated in FIG. 1) periodically writes a time value to the last touched time 152, for example using dynamic DNS. The time value may be formatted in any way to represent time or the passage of time. The time value may be a number of seconds since Jan. 1, 1970. The time value may be referenced to a different epoch than Jan. 1, 1970. The time value may be counted in different time units. The time value may be an integer count that increments by 1 on each successive write to the last touched time 152. For example, on a first write occasion, the last touched time 152 may receive the value 13; on a second write occasion, the last touched time 152 may receive the value of 14; on a third write occasion, the last touched time 152 may receive the value of 15. When the periodic interval of writing to the last touched time 152 is known, such an integer count can be mapped to a time value or at least to a change in time value or a delta of time (e.g., the epoch may be ignored and only the change in time from a previous write event may of concern).

The monitoring application in primary mode 130 may write the time value to the last touched time 152 about every 30 seconds, about every minute, about every 2 minutes, about every 5 minutes, about every 15 minutes, or some other periodic interval of time. The identity of the monitoring application executing in the primary mode (e.g., an IP address of the monitoring server on which the subject monitoring application that is executing in the primary mode of operation executes or another identification) is stored in the primary monitor identity 154. The DNS TXT record 150 may be stored on a particular one of the DNS servers in the DNS 114, for example on the first DNS server 116. It is understood that, in an embodiment, a different DNS resource record type than a DNS TXT resource record type may be used to store the last touched time 152 and the primary monitor identity 154 described above and to support the functionality described above.

If the monitoring application in primary mode 130 detects that any application server 106, 112 is out of service, the monitoring application in primary mode 130 fails over the failed application server 106, 112 (e.g., modifies the A records or AAAA records associated with the failed application server to resolve the logical name to a different application server that remains active or healthy). Being out of service may comprise being unresponsive to a communication request or unresponsive to a PING command sent from the monitoring application in primary mode 130. When the failed server is restored to service, the monitoring application in primary mode 130 may restore the A records and/or AAAA records it had changed before to again resolve the logical name to the restored application server. Alternatively, a system administrator may restore the A records and/or the AAAA records.

Figure 3:
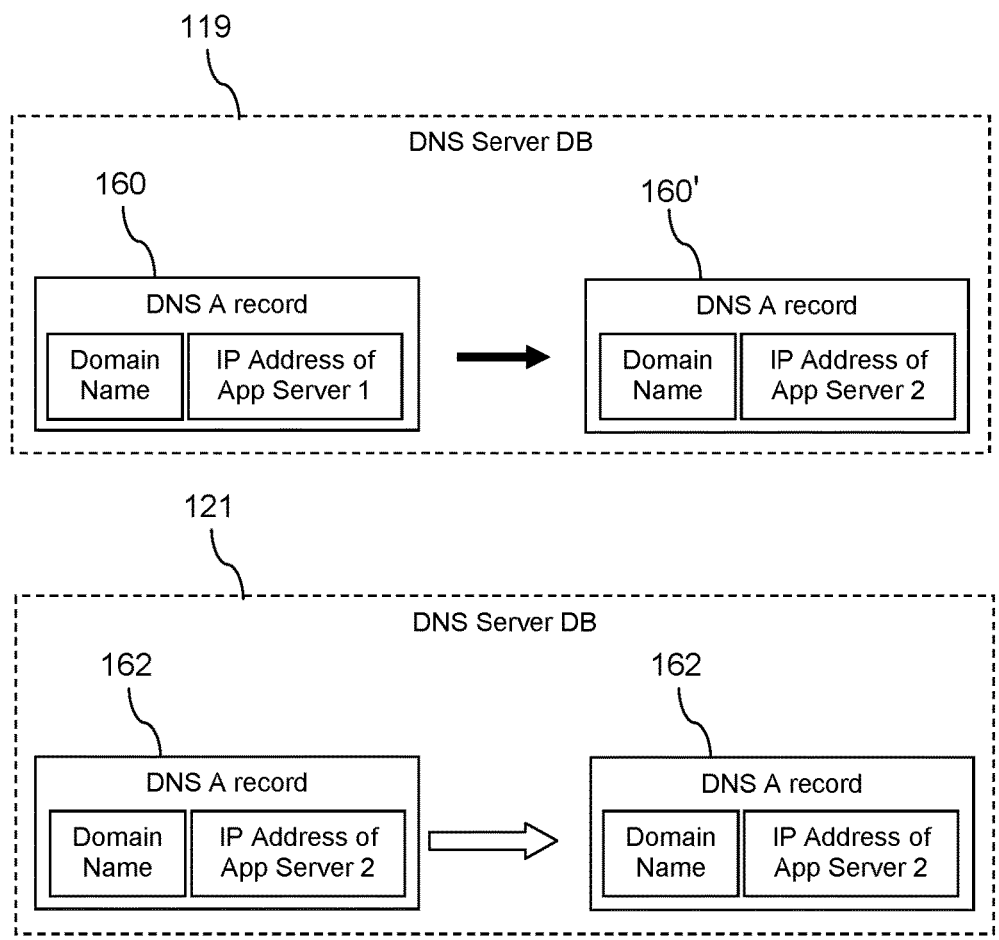
FIG. 3 is an illustration of an updated value in a domain name system A record according to an embodiment of the disclosure.

Turning now to FIG. 3, DNS A records and/or AAAA records in the second DNS server data store 119 and in the third DNS server data store 121 are described. The example used above is continued here. A first DNS A record 160 stored in the second DNS server data store 119 maps a logical name or domain name (e.g., NOC-tool.corp.bigtelecomco.com) to the IP address of the first application server 106. A second DNS A record 162 stored in the third DNS server data store 121 maps the same logical name to the IP address of the second application server 112. Suppose the first application server 106 experiences a failure (is unreachable from the network 108 by the monitoring application executing in primary mode 130 due to a power grid failure local to the first application server 106, due to a fiber communication line cut, due to a crash of the first application server 106, or due to some other cause), the monitoring application executing in the primary mode of operation 130 may overwrite the first DNS A record 160 to a modified first DNS record 160' that maps the logical name to the IP address of the second application server 112. This would have the effect of causing some client requests from operator workstations 102 to route away from the first application server 106 to the NOC application 110 executing on the second application server 112. It is understood that in the above description the A records could be AAAA records (for example, if the IP addresses were IPv6 addresses).

Now with reference again to FIG. 2, if the monitoring application executing in the primary mode of operation 130 cannot communicate with any of the application servers 106, 112, it stops writing to the last touched time 152. As will be seen below, this will cause the role of monitoring in the primary mode of operation to be transferred to a different monitoring application 134. It is assumed that concurrent failure of a plurality of application servers 106, 112 is unlikely and that the failure is most likely associated to the monitoring application executing in the primary mode of operation 130 on the first monitoring server 132.

In an embodiment, the monitoring applications executing in the secondary mode of execution 134 also monitor the application servers 106, 112 but do not take action if a failure is detected, leaving the responsibility for taking action to the monitoring application executing in the primary mode 130. The monitoring applications executing in the secondary mode of execution 134 also read the last touched time 152 in the DNS TXT record 150. If one of the monitoring applications executing in the secondary mode of execution 134 reads a last touched time 152 that contains a time value that is aged beyond a predetermined age threshold, the subject monitoring application executing in the secondary mode of execution 134 writes its own identity into the primary monitor identity 154, writes a time value to the last touched time 152, and begins executing in the primary execution mode of operation. The predetermined age threshold may be defined as a number of periodic intervals for writing or updating the last touched time 152 into the DNS TXT record 150. For example, two times the periodic interval, three times the periodic interval, five times the period interval, ten times the periodic interval, or some other number of the periodic intervals. If the monitoring application executing in the primary mode of execution 130 writes the last touched time 152 every minute, the predetermined age threshold may be 2 minutes, 3 minutes, 5 minutes, 10 minutes, or some other time duration.

Alternatively, if the monitoring application executing in the primary mode of operation 130 writes a raw integer count to the last touched time 152 every period, the predetermined age threshold may be viewed as a change or delta from a previous reading from the last touched time 152 some integer such as a change or delta of 2, 3, 5, 10, or some other integer. If the previous time the monitoring application executing in the secondary mode of operation 134 read the integer 11 from the last touched time 152 and on a current read value read from the last touched time 152 remains 11, this may be a trigger for deeming the monitoring application executing in the primary mode of operation 130 to be failed. Alternatively, the monitoring application executing in the primary mode of operation 130 may be deemed to be failed if the last touched time 152 value has not changed over two successive reads from the last touched time 152 by the same monitoring application executing in the secondary mode of operation 134.

Failure of the monitoring application executing in the primary mode of operation 130 for an excessive duration of time may indicate that the monitoring application 130 or the first monitoring server 132 has failed and is unable to perform the failover function if it is called for. In this way, the role of primary execution mode of operation may be dynamically assumed by a monitoring application executing in the secondary mode of operation 134. It is understood that a wide variety of causes may prevent the monitoring application executing in the primary mode of operation 130 or the first server 132 from writing timely to the last touched time 152. The communication link from the first server 132 to the network 108 may be interrupted (e.g., a cut occurs in a fiber communication line). A firewall reconfiguration may erroneously exclude the monitoring application executing in the primary mode of operation 130 or the first server 132 from accessing the application servers 106, 112 or from accessing the DNS 114.

The mechanism for detecting failure of the monitoring application executing in the primary mode of operation 130 and transferring the role of primary mode to a different monitoring application 134 can be said to be handled within the DNS protocol in the sense that it rides on top of the DNS protocol. Thus, if DNS functionality continues in the system 100, the role transfer mechanism would be expected to function. If the DNS functionality fails in the system 100, it may be of no matter that the role transfer mechanism stops functioning because the system 100 will fail catastrophically without DNS service.

Figure 4A:
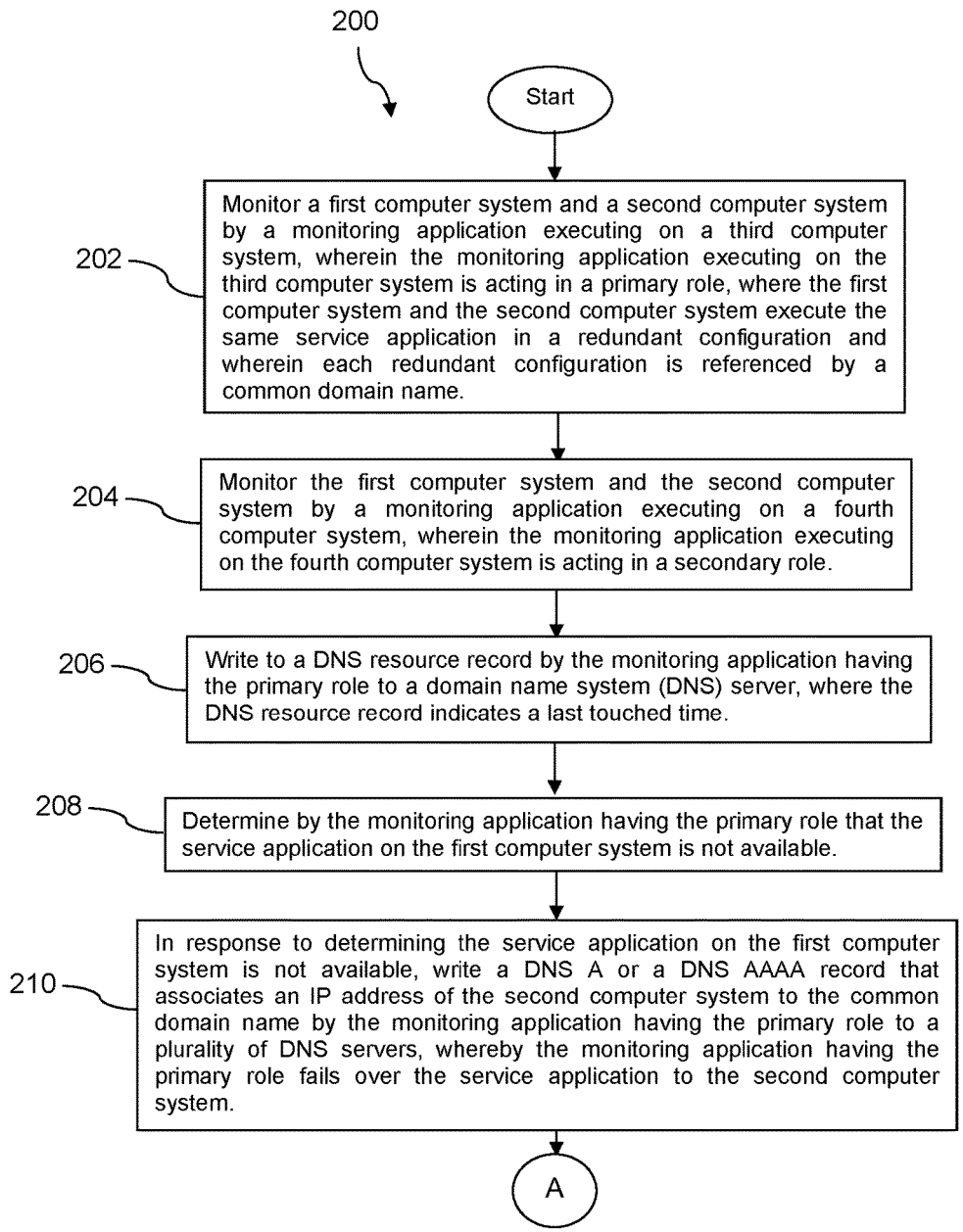
FIG. 4A and FIG. 4B is a flow chart of a method according to an embodiment of the disclosure.
Figure 4B:
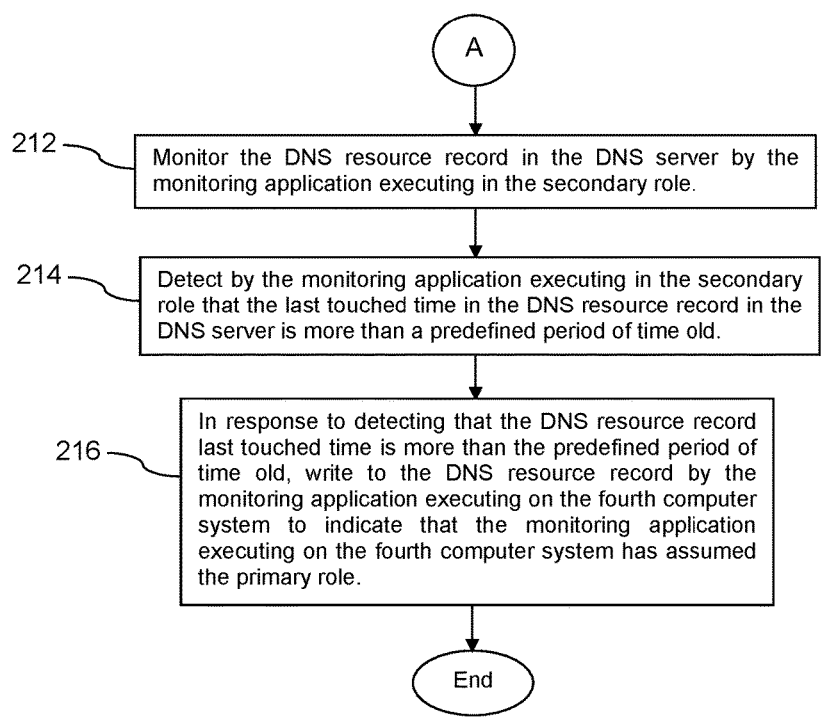

Turning now to FIG. 4A and FIG. 4B, a method 200 is described. At block 202, monitor a first computer system and a second computer system by a monitoring application executing on a third computer system, wherein the monitoring application executing on the third computer system is acting in a primary role, where the first computer system and the second computer system execute the same service application in a redundant configuration and wherein each redundant configuration is referenced by a common domain name. For example, the monitoring application executes on the first monitoring server 132, the first computer system is the first application server 106 executing the NOC application 104, and the second computer system is the second application server 112 executing the same NOC application 110. Alternatively, the service application may be an e-commerce on-line retail sales application or an electrical power distribution grid monitoring and management application. The NOC application 104, 110 may be said to be service applications and to execute within a redundant configuration, that is within the high availability service 103. The common domain name may be referred to as a logical name. The common domain name may be, for example, "NOC-tool-.corp.bigtelecomco.com."

At block 204, monitor the first computer system and the second computer system by a monitoring application executing on a fourth computer system, wherein the monitoring application executing on the fourth computer system is acting in a secondary role. For example, the fourth computer system may be the second monitoring server 136. At block 206, write to a DNS resource record such as a TXT record by the monitoring application having the primary role to a domain name system (DNS) server, where the DNS resource record indicates a last touched time. For example the monitoring application executing in the primary mode of operation 130 executing on the first monitoring server 132 writes to the last touched time 152 of a DNS TXT record 150. It is understood that the monitoring application executing in the primary role may repeat the processing of blocks 204 and 206 iteratively, as long as it retains the primary role. It is also understood that writing the last touched time 152 of a DNS TXT record 150 may also be referred to as updating the DNS TEX record 150.

At block 208, determine by the monitoring application having the primary role that the service application on the first computer system is not available. For example, the monitoring application executing in the primary mode of operation 130 executing on the first monitoring server 132 determines that the NOC application 104 executing on the first application server 106 is unavailable. This may comprise determining that communication messages directed by the monitoring application 130 to the first server 106 are not acknowledged or some other method of determining availability of the NOC application 104 and the first application server 106.

At block 210, in response to determining the service application on the first computer system is not available, write one of a DNS A record or a DNS AAAA record that associates an IP address of the second computer system to the common domain name by the monitoring application having the primary role to a plurality of DNS servers, whereby the monitoring application having the primary role fails-over the service application to the second computer system. At block 212, monitor the DNS resource record in the DNS server by the monitoring application executing in the secondary role. For example, the monitoring application executing in the secondary mode of operation 134 on the second monitoring server reads the last touched time 152 in the DNS TXT record 150 and determines an age of the last touched time 152 by comparing to a current time. The processing of block 212 may be repeated iteratively by the monitoring application executing in the secondary role.

At block 214, detect by the monitoring application executing in the secondary role that the last touched time in the DNS resource record in the DNS server is more than a predefined period of time old. At block 216, in response to detecting that the DNS resource record last touched time is more than the predefined period of time old, write to the DNS resource record by the monitoring application executing on the fourth computer system to indicate that the monitoring application executing on the fourth computer system has assumed the primary role. The processing of block 214 and 216 may be focused on a change in time or a change in an integer count, as described further above. Method 200 may be said to provide a high availability computing service. It is understood that writing to the DNS resource record by the monitoring application may also be referred to as updating the DNS resource record.

Figure 5:
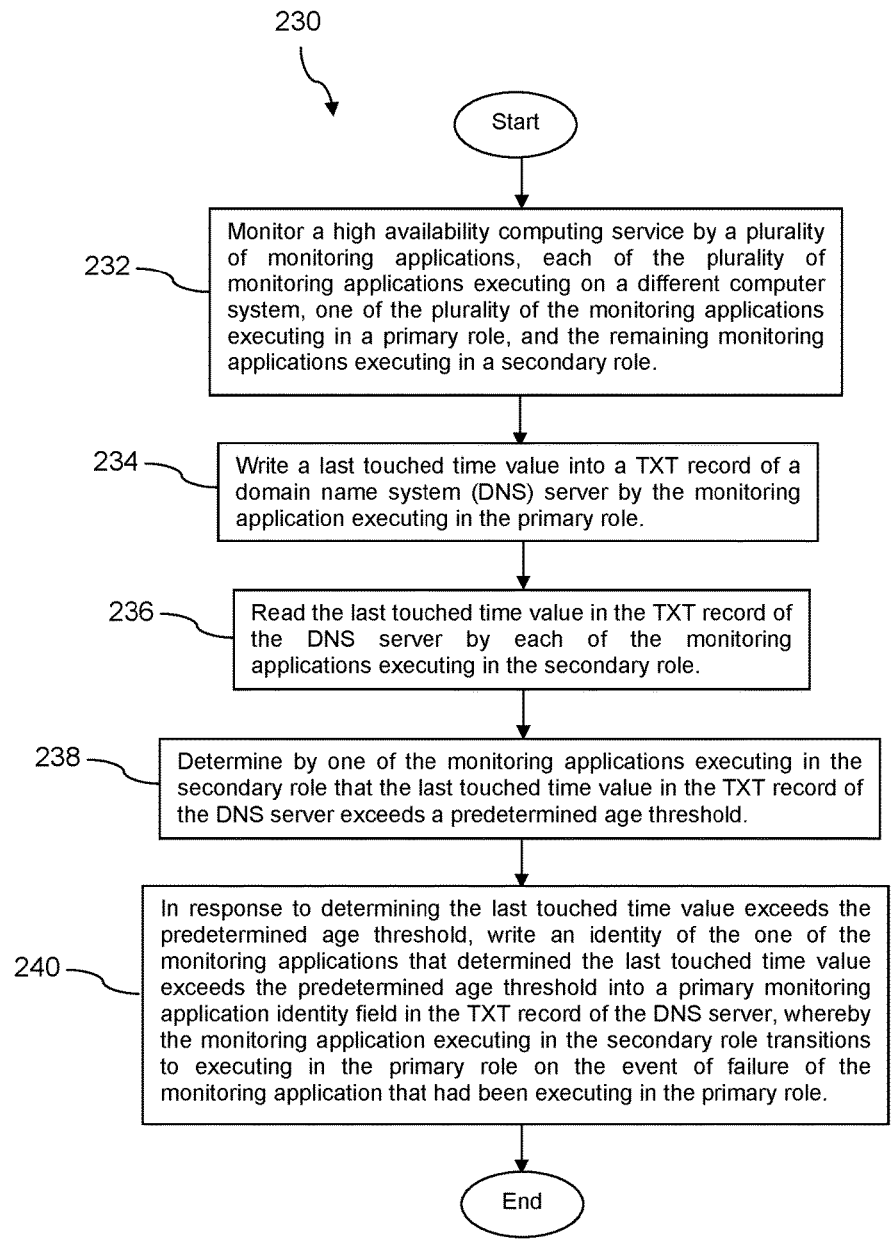
FIG. 5 is a flow chart of a method according to an embodiment of the disclosure.

Turning now to FIG. 5, a method 230 is described. At block 232, a plurality of monitoring applications monitor a high availability computing service, each of the plurality of monitoring applications executing on a different computer system, one of the plurality of the monitoring applications executing in a primary role, and the remaining monitoring applications executing in a secondary role. At block 234, the monitoring application executing in the primary role writes a last touched time value into a TXT record of a domain name system (DNS) server. At block 236, each of the monitoring applications executing in the secondary role reads the last touched time value in the TXT record of the DNS server. The processing of blocks 234 and 236 reiterates. It is understood that at block 234 the monitoring application executing in the primary role may be said to update the last touched time value in the TXT record of the DNS server.

At block 238, one of the monitoring applications executing in the secondary role determines that the last touched time value in the TXT record of the DNS server exceeds a predetermined age threshold. At block 240, in response to determining the last touched time value exceeds the predetermined age threshold, write an identity of the one of the monitoring applications that determined the last touched time value exceeds the predetermined age threshold into a primary monitoring application identity field in the TXT record of the DNS server, whereby the monitoring application executing in the secondary role transitions to executing in the primary role on the event of failure of the monitoring application that had been executing in the primary role. When a plurality of monitoring applications execute in the secondary mode of operation, any one of them may be first to detect the excessive age of the last touched time value and assume the primary role. In practice it does not matter which of those monitoring applications assumes the primary role so long as one of them does.

To avoid any possible collisions among monitoring applications 130, 134, writing to the primary monitor identity 154 and the last touched time 152 may be guarded by a semaphore object. In this case, a monitoring application executing in the secondary mode of operation 134 must first get the semaphore object before writing to the primary monitor identity 154 of the last touched time 152. If the monitoring application in primary mode of operation 130 obtains the semaphore after a monitoring application in secondary mode of execution 134 detects the excessive age but before the monitoring application executing in the secondary mode of operation 134 obtains the semaphore, the monitoring application in secondary mode of operation 134 may be configured to recheck the last touched time 152 before again attempting to secure the semaphore and then write its identity into the primary monitor identity 154. It is understood that, in an embodiment, another DNS resource record type may be used in the place of the DNS TXT record in method 230

Figure 6:
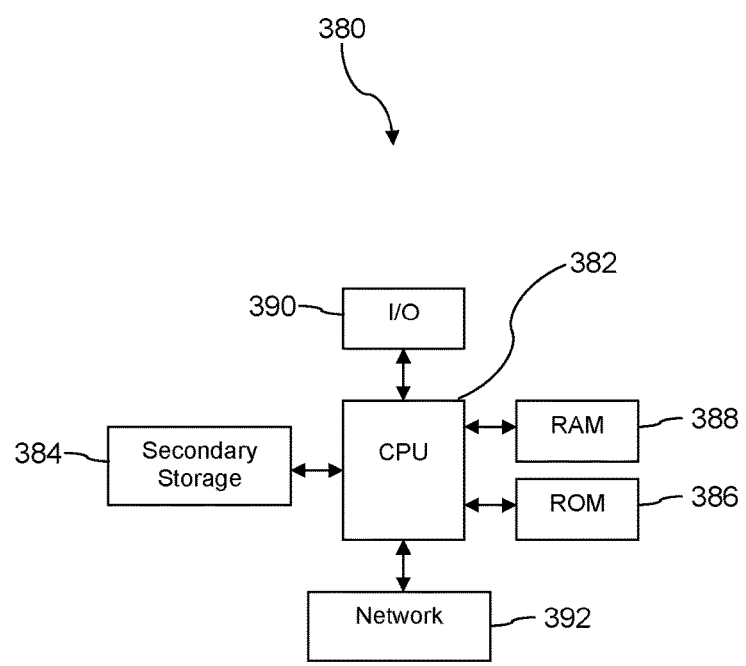
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a high availability computing service, comprising:
   monitoring a first computer system and a second computer system by a monitoring application executing on a third computer system, wherein the monitoring application executing on the third computer system is acting in a primary role, where the first computer system and the second computer system execute the same service application in a redundant configuration and wherein each redundant configuration is referenced by a common domain name;
   monitoring the first computer system and the second computer system by a monitoring application executing on a fourth computer system, wherein the monitoring application executing on the fourth computer system is acting in a secondary role;
   writing to a DNS resource record by the monitoring application having the primary role to a domain name system (DNS) server, where the DNS resource record is a DNS TXT record and indicates a last touched time, wherein writing to the DNS TXT record is performed according to dynamic DNS;
   determining by the monitoring application having the primary role that the service application on the first computer system is not available;
   in response to determining the service application on the first computer system is not available, writing one of a DNS A record or a DNS AAAA record that associates an IP address of the second computer system to the common domain name by the monitoring application having the primary role to a plurality of DNS servers, whereby the monitoring application having the primary role fails over the service application to the second computer system;
   monitoring the DNS TXT resource record in the DNS server by the monitoring application executing in the secondary role, wherein the monitoring comprises reading the last touched time in the DNS TXT record and determining an age of the last touched time by comparing a current time;
   detecting by the monitoring application executing in the secondary role that the last touched time in the DNS TXT resource record in the DNS server is more than a predefined period of time old based on the monitoring; and
   in response to detecting that the DNS TXT resource record last touched time is more than the predefined period of time old, writing to the DNS TXT resource record by the monitoring application executing on the fourth computer system to indicate that the monitoring application executing on the fourth computer system has assumed the primary role.

2. The method of claim 1, wherein the service application is a network operation center (NOC) application.

3. The method of claim 1, wherein the service application is an e-commerce on-line retail sales application.

4. The method of claim 1, wherein the service application is an electrical power distribution grid monitoring and management application.

5. The method of claim 1, wherein the first computer system comprises a plurality of different hosts and the second computer system comprises a plurality of different hosts.

6. The method of claim 5, wherein the locations of the first computer system and the second computer system are different and provide geographical redundancy.

7. The method of claim 1, wherein the monitoring application having the primary role writes to the DNS TXT resource record periodically.

8. The method of claim 7, wherein the monitoring application having the primary role writes to the DNS TXT resource record about every one minute.

9. A method of providing a high availability computing service, comprising:
   monitoring a high availability computing service by a plurality of monitoring applications, each of the plurality of monitoring applications executing on a different computer system, one of the plurality of the monitoring applications executing in a primary role, and the remaining monitoring applications executing in a secondary role;
   writing a last touched time value into a DNS resource record of a domain name system (DNS) server by the monitoring application executing in the primary role, wherein the DNS resource record is a DNS TXT record, and wherein writing to the DNS TXT record is performed according to dynamic DNS;
   reading the last touched time value in the DNS TXT resource record of the DNS server by each of the monitoring applications executing in the secondary role;
   determining by one of the monitoring applications executing in the secondary role an age of the last touched time value in the DNS TXT resource record of the DNS server;
   determining by the one of the monitoring applications executing in the secondary role that the last touched time value in the DNS TXT resource record of the DNS server exceeds a predetermined age threshold based on determining the age of the last touched time value;
   in response to determining the last touched time value exceeds the predetermined age threshold, writing an identity of the one of the monitoring applications that determined the last touched time value exceeds the predetermined age threshold into a primary monitoring application identity field in the DNS TXT resource record of the DNS server, whereby the monitoring application executing in the secondary role transitions to executing in the primary role on the event of failure of the monitoring application that had been executing in the primary role.

10. The method of claim 9, wherein the monitoring application executing in the primary role writes the last touched time value into the DNS TXT resource record of the DNS server periodically.

11. The method of claim 10, wherein the predetermined age threshold is at least two periods of the periodic interval of writing the last touched time value.

12. The method of claim 10, wherein the monitoring application executing in the primary role writes the last touched time value into the DNS TXT resource record of the DNS server about every 1 minute.

13. The method of claim 10, wherein the monitoring application executing in the primary role writes the last touched time value into the DNS TXT resource record of the DNS server about every 5 minutes.

14. A high availability computing service system, comprising:
- a plurality of application servers, each application server comprising:
- an application server processor,
- an application server non-transitory memory, and
- a service application stored in the application server non-transitory memory that, when executed by the application server processor, receives and processes client requests addressed to a common domain name that is mapped by a domain name system (DNS) to an application server from among the plurality of application servers; and
- a plurality of service monitoring servers, each service monitoring server comprising: a monitoring server processor,
- a monitoring server non-transitory memory, and a monitoring application stored in the non-transitory memory that, when executed by the monitoring server processor, that is configured to operate in a primary monitoring mode and to operate in a secondary monitoring mode,
- when operating in the primary mode, the monitoring application monitors the plurality of application servers, writes a current time value periodically to a last touched time value into a DNS resource record of a DNS server, and when one of the plurality of application servers fails, writes one of a DNS A record or a DNS AAAA record to a DNS server that associates an IP address of an active one of the plurality of application servers to a common domain name whereby the client requests to the failed application server are directed to an active application server, wherein the DNS resource record is a DNS TXT record, and wherein writing to the DNS TXT record is performed according to dynamic DNS, and
- when operating in the secondary mode, the monitoring application monitors the plurality of application servers, reads the last touched time value from the DNS TXT resource record of the DNS server, determines an age of the last touched time value in the DNS TXT resource record, detects when the DNS TXT resource record last touched time value is more than a predefined period of time old based on the determined age of the last touched time value, and when the DNS TXT resource record last touched time is detected to be more than the predefined period of time old, writes to the DNS TXT resource record of the DNS server to indicate that the monitoring application executing in secondary mode has assumed the primary mode role, whereby the monitoring application executing in the secondary monitoring mode assumes the primary mode role when the monitoring application executing in the primary mode role fails.

15. The system of claim 14, wherein the service application is a network operations center (NOC) application.

16. The system of claim 14, wherein the service application is an e-commerce on-line retail sales application.

17. The system of claim 14, wherein the service application is an electrical power distribution grid monitoring and management application.

18. The system of claim 14, wherein the monitoring application executing in the primary monitoring mode writes the current time value about every minute into the last touched time value into the DNS TXT resource record of the DNS server.

19. The system of claim 14, wherein the monitoring application executing in the primary monitoring mode writes the current time value about every 5 minutes into the last touched time value into the DNS TXT resource record of the DNS server.

* * * * *